United States Patent
Olesen et al.

(10) Patent No.: US 8,216,500 B2
(45) Date of Patent: Jul. 10, 2012

(54) METHOD OF MANUFACTURING PRE-BENT WIND TURBINE BLADES

(75) Inventors: Erik Eigil Olesen, Kolding (DK); Michael Schølarth Koefoed, Vejen (DK); Steven Hauge Pedersen, Kolding (DK); Klavs Jespersen, Kolding (DK); John Joseph Jeno, Grand Forks, ND (US)

(73) Assignee: LM Glasfiber A/S, Kolding (DK)

( * ) Notice: Subject to any disclaimer, the term of this patent is extended or adjusted under 35 U.S.C. 154(b) by 0 days.

(21) Appl. No.: 13/176,419

(22) Filed: Jul. 5, 2011

(65) Prior Publication Data

US 2012/0007269 A1 Jan. 12, 2012

(30) Foreign Application Priority Data

Jul. 9, 2010 (EP) ..................................... 10169029

(51) Int. Cl.
*B29C 70/44* (2006.01)
*B29C 45/00* (2006.01)
*B28B 5/00* (2006.01)
*B29C 65/00* (2006.01)
*A23G 1/22* (2006.01)

(52) U.S. Cl. ........ 264/258; 264/101; 264/241; 264/257; 264/299; 264/319; 264/500; 264/510; 264/511; 264/571; 156/145; 156/245; 156/285; 156/286; 425/111; 425/120

(58) Field of Classification Search ................... 264/101, 264/241, 257, 258, 299, 319, 500, 510, 511, 264/553, 571; 156/145, 245, 285, 286; 425/111, 425/120, 129.1, 388
See application file for complete search history.

(56) References Cited

U.S. PATENT DOCUMENTS 5,665,301 A * 9/1997 Alanko ......................... 264/571
(Continued)

FOREIGN PATENT DOCUMENTS

EP 1 019 631 B1 7/2000
(Continued)

OTHER PUBLICATIONS

Extended European Search Report, issued Dec. 17, 2010 in the counterpart European Application No. 10169029.5, four (4) pages.

*Primary Examiner* — Christina Johnson
*Assistant Examiner* — Atul P Khare
(74) *Attorney, Agent, or Firm* — The Nath Law Group; Jerald L. Meyer; Robert T. Burns

(57) ABSTRACT

In a method of manufacturing a blade shell half of a pre-bent wind turbine blade by means of vacuum-assisted resin transfer moulding (VARTM), a fibre lay-up (16) is placed on a mould surface (14) and a distribution layer (24) is placed above the fibre lay-up (16). At least one segmentation area is provided in the distribution layer by providing at least one transversely extending flow barrier in the distribution layer (24) preventing or restricting longitudinal resin flow to the distribution layer. A longitudinally extending first feed channel (27) is placed above the distribution layer (24). The first feed channel (27) is divided into at least two feed channel sections, a feed channel section being arranged in each distribution layer segment. A vacuum bag (43) is arranged on top of the mould part (13) to define a mould cavity. The mould cavity (44) is evacuated and liquid resin is supplied to each feed channel section through a resin inlet to fill the mould cavity and impregnate the fibre lay-up.

20 Claims, 4 Drawing Sheets

U.S. PATENT DOCUMENTS

| | | | |
|---|---|---|---|
| 6,582,196 B1 * | 6/2003 | Andersen et al. | 416/202 |
| 6,627,142 B2 * | 9/2003 | Slaughter et al. | 264/510 |
| 7,255,549 B2 * | 8/2007 | Hadley | 425/129.1 |
| 7,803,302 B2 * | 9/2010 | Hansen | 264/258 |
| 7,892,467 B2 * | 2/2011 | Kofoed et al. | 264/101 |
| 7,939,001 B2 * | 5/2011 | Liebmann | 264/257 |
| 2002/0149134 A1 * | 10/2002 | Hemphill et al. | 264/255 |
| 2010/0189973 A1 * | 7/2010 | Mikkelsen et al. | 428/213 |
| 2010/0201045 A1 * | 8/2010 | Schibsbye | 264/511 |
| 2010/0209651 A1 * | 8/2010 | Mikkelsen et al. | 428/56 |
| 2011/0318186 A1 * | 12/2011 | Kristensen et al. | 416/219 R |

FOREIGN PATENT DOCUMENTS

| | | |
|---|---|---|
| EP | 1 428 650 A1 | 6/2004 |
| WO | 2006/058541 A1 | 6/2006 |

* cited by examiner

METHOD OF MANUFACTURING PRE-BENT WIND TURBINE BLADES

This is a Non-Provisional Application, an application claiming the benefit from European Application No. 10169029.5, filed Jul. 9, 2010, the content of which is hereby incorporated by reference in its entirety.

The present invention relates to a method of manufacturing pre-bent wind turbine blades, more specifically a method of manufacturing a blade shell half of a pre-bent wind turbine blade comprising two blade shell halves being interconnected along a leading edge and a trailing edge, said blade having a root region, an airfoil region with a tip region, optionally a transition region between the root region and the airfoil region, and a centre line being defined by the centre line of the normally cylindrically shaped root region, the blade shell half being made of a fibre composite material by means of vacuum-assisted resin transfer moulding (VARTM), wherein fibre material is impregnated with liquid resin in a mould cavity of a mould including a rigid mould part with a rim and a mould surface forming an outer surface of the blade shell half.

One of the shell halves forms the pressure side of the blade and other shell half forms the suction side. The pressure side of the blade is also called the upwind side, as it faces the wind during operation of the wind turbine. The suction side of the blade is also called the downwind side, as it faces away from the wind during operation of the wind turbine.

By pre-bent blade is to be understood a blade which as seen from the root region towards the tip region at a distance from the root region extends forwards towards the wind in a forwardly curving manner so that the tip of the blade is positioned in front of the centre line of the root region. An example of a pre-bent wind turbine blade is disclosed in EP 1019631B1.

Wind turbine blades made of a composite material, such as fibre-reinforced resin, are flexible and when subjected to a gust they may flex up to about 6-8 m or more at the tip depending on the length thereof.

Pre-bent blades may have such a curvature that the tip is arranged 0.5-4 m or more from the centre line of root depending on the length of the blade.

As wind turbine blades have become progressively longer in the course of time and today can be more than 70 m long, it has become increasingly attractive to use a pre-bent blades for wind turbines, as they allow for placing the wind turbine rotor close to the tower of the wind turbine, while still avoiding that the blade collide with the tower when subjected to a gust.

When manufacturing blade shell halves the mould is generally arranged so that the line corresponding to the centre line of the root region of the blade is substantially horizontal. This centre line often corresponds to a pitch axis of the blade.

However, when manufacturing the shell halves for pre-bent blades, especially blades pre-bent to arrange the tip about 1 m or more in front of the centre line of the root region, the fibre/resin ratio tends to be higher in the highest positioned areas of the mould surface than in the lowest positioned areas of the mould surface as seen in the longitudinal direction of the mould. This is especially the case in a longitudinally extending zone located at the lowest area of the mould as seen in the transverse direction thereof. In the above zone a plurality of fibre layers is frequently placed on top of each other in order to form a load-bearing structure of the blade shell half comprising a substantially higher number of fibre layers than laterally adjacent areas of the fibre lay-up.

Thus, due to the gravity acting on the resin, a too high fibre/resin ratio tends to be formed at the highest positioned areas of the mould and a too low fibre/resin ratio tends to be formed at the lowest positioned areas of the mould as seen in the longitudinal direction thereof.

A too high fibre/resin ratio has a negative influence on the fatigue strength of a composite material comprising fibre-reinforced resin. This is especially a problem when moulding the upwind shell half, as the highest positioned area of the mould surface is in the mid portion of the half shell when seen in the longitudinal direction and as the mid portion of the blade is subjected high loads during operation of the wind turbine.

It is an object of the present invention to provide a new and improved method of manufacturing a blade shell of a pre-bent wind turbine blade and wherein the above problems are alleviated or solved.

According to the invention this obtained by a method comprising the following steps:
a. placing a fibre lay-up including a number of fibre layers on the mould surface;
b. placing a distribution layer above the fibre lay-up;
c. providing at least one segmentation area in the distribution layer by dividing the distribution layer into at least two distribution layer segments as seen in a longitudinal direction of the rigid mould part by providing at least one transversely extending flow barrier in the distribution layer preventing or restricting longitudinal resin flow through the distribution layer;
d. placing at least one longitudinally extending feed channel above the distribution layer, said first feed channel being open towards the distribution layer so as to provide resin communication therewith, said first feed channel preferably extending substantially from the root region to the tip region and being divided into at least two separate feed channel sections, a feed channel section being arranged in each distribution layer segment;
e. arranging a vacuum bag on top of the mould part and sealing the vacuum bag to the mould part to define the mould cavity;
f. evacuating the mould cavity;
g. supplying liquid resin to each feed channel section through a resin inlet so as to feed the resin to each of the at least two segments of the distribution layer in order to fill the mould cavity and to impregnate the fibre lay-up;
h. allowing resin to cure so as to form the blade shell half.

The term distribution layer is to be understood as a layer which allows for a higher resin flow speed than allowed for by the fibre layer.

The fibre lay-up may be in form of unidirectional mats, woven mats, non-woven mats, etc. and a combination thereof, and the fibre mats may contain glass fibres, carbon fibres, aramid fibres, steel fibres, natural fibres, etc. and a combination thereof.

The resin can be a polyester resin, a vinylester resin, an epoxy resin or any other thermosetting resin or polymer or it can be a thermoplastic resin or polymer.

The segmentation area providing at least one transversely extending flow barrier in the distribution layer prevents a too fast resin flow through the distribution layer in the longitudinal direction of the mould, and especially prevents or restrict longitudinal resin flow between the two distribution layer segments formed by the flow barrier, whereby a desired fibre/resin ratio is obtained in the fibre lay-up below the two distribution layers.

Further, by dividing the first feed channel into feed channel sections substantially corresponding to the distribution layer segments it is possible to control the supply of resin to the distribution layer segments and thereby to the lay-up therebelow so as to obtain the desired fibre/resin ratio in the fibre lay-up.

Prior to step a. a release medium and subsequently a gelcoat may be applied to the mould surface.

The gelcoat enables easy demoulding of the shell half after curing of the resin and the gelcoat defines the outer surface of the finished blade shell half.

Additionally, between step a. and step b. a tear-off layer, preferably in the form of a perforated polymer film layer, may be placed on the fibre lay-up.

As the cured resin which remains in the first feed channel, in any additional feed channels, and in the distribution layer does not contribute essentially to the strength of the blade shell half, it is preferred to remove the feed channels and the distribution layer including the resin cured therein from the moulded blade shell half. The use of a tear-off layer facilitates the removal of the first feed channel, any additional feed channels, the distribution layer and cured resin remaining in these parts.

Additionally, the removal of feed channels and the distribution layer reduces the weight of the blade shell half without essentially reducing the strength thereof.

The first feed channel and any additional feed channels may be formed of a tube with an omega profile.

The mould cavity may be evacuated by means of one or more vacuum channels, advantageously provided along the rim of the mould.

According to an embodiment of the invention, the first feed channel may be divided into three feed channel sections and the distribution layer is divided into three distribution layer segments.

This embodiment has proved particularly advantageous when moulding upwind blade shell halves, wherein the height difference between the highest and the lowest point of the mould surface exceed 1 m. However, it should be noted that the first feed channel may be divided into more than three feed channel sections and the distribution layer may be divided into more than three distribution layer segments.

According to a further embodiment of the invention, the transversely extending flow barrier may be provided by omitting the distribution layer in a transversely extending portion thereof.

The transversely extending portion in which the distribution layer is omitted may have a width of 5-100 cm, optionally of 15-80 cm and optionally of 25-50 cm.

According to an additional embodiment of the invention, the transversely extending flow barrier may be provided by applying a formable substance, such as a so-called tacky tape, to the distribution layer in a transversely extending portion thereof.

In practice, excellent results have been obtained by means of this embodiment.

According to an embodiment of the invention the first feed channel may be divided into sections adjacent to or in the segmentation area in which the distribution layer is divided into distribution layer segments.

According to the invention, the first feed channel may be divided into feed channel sections and the distribution layer may be divided into distribution layer segments so that a height difference between a lowest and a highest level of the mould surface is at most 1.6 m, optionally 1.4 m, optionally 1.2 m, optionally 1.0 m and optionally 0.8 m.

Tests have shown that in order to obtain the desired fibre/resin ratio especially in the highest position area of adjacent sections, it is advantageous to provide a segmentation of the first feed channel and the distribution layer so that the above height difference is not too large, i.e. below 1.2 m. However, in certain cases a height difference of more than 1.2 m may be applicable.

The resin may be supplied to the inlet of the respective feed channel sections through supply lines from separate resin sources, each of said supply lines being provided with a valve means for stopping the resin flow.

Optionally, resin may be supplied to the inlet of the respective feed channel sections through supply lines from a common resin source, each of the supply lines provided with a valve means for stopping the resin flow.

Additionally, according to the invention longitudinally adjacent sections of the first feed channel may be interconnected by a connection line provided with a valve means between adjacent ends of the adjacent feed channel sections to allow for an interruption of the resin flow between said adjacent feed channel sections, the feed channel preferably being provided with a single inlet.

As a result, a simple arrangement is provided for feeding resin to the various feed channel sections allowing for controlling the supply of resin to the feed channel sections in the desired amounts and at the desired point of time by opening the closing the valve means.

According to a further embodiment of the invention, in step d. at least one additional essentially longitudinally extending feed channel may be arranged above the fibre distribution layer on either side of and laterally spaced apart from the longitudinally extending first feed channel, said additional feed channels preferably being continuous feed channels, i.e. they are not divided into sections, and preferably the transversely extending flow barrier is not provided in the distribution layer below said additional feed channel.

By providing the additional feed channels, a faster and more reliable resin impregnation of the fibre lay-up areas laterally spaced apart from the fibre lay-up area below the first feed channel is obtained compared to the situation, where such additional feed channels are not provided.

According to an embodiment of the invention in step a. a plurality of fibre layers is placed on top of each other in a longitudinally extending zone of the mould, said plurality of fibre layers forming a load-bearing structure of the blade shell half, said structure comprising a substantially higher number of fibre layers than laterally adjacent areas of the fibre lay-up and wherein the at least one first feed channel is arranged in said zone forming the load-bearing structure.

As a result, a blade shell half is formed provided with a load-bearing structure extending in the longitudinal direction of the blade shell half, and as seen in the transverse direction extending in an area of the lowest positioned portion of the mould. Thus, the above zone extends in the lowest positioned area of the blade shell half. Such a blade shell half is frequently used in the production of wind turbine blades.

Preferably, the transversely extending flow barrier is only provided in the above zone forming the load-bearing structure and may extend over a portion of or over the entire width of said zone. However, it is preferred that the flow barrier extends over essentially the entire width of said zone.

The zone forming the load-bearing structure may have a thickness of 10-100 mm, optionally of 20-80 mm, optionally of 30-50 mm, and a width of 30-200 cm, optionally of 40-150 cm and optionally of 50-120 cm.

The width of the zone forming the load-bearing structure may decrease from the root region towards the tip region.

The thickness of the zone forming the load-bearing structure may decrease from root region toward the tip region.

The zone forming the load-bearing structure may extend from the root region to the tip region.

According to an additional embodiment of the invention, the resin supply to adjacent sections of the first feed channel may be controlled so that the resin supply to the section having the lowest positioned point is stopped prior to stopping the resin supply to the section having the highest positioned point.

Preferably, resin is supplied to the different channel sections of the first feed channel simultaneously with or after resin is supplied to the feed channel section having a higher positioned point than an adjacent channel section. After the resin supply to the additional channel sections has been stopped, resin is supplied to the fibre lay-up arranged in the higher positioned area, whereby the desired fibre/resin ratio is obtained in the higher positioned area of the fibre lay-up. In this connection it should be noted that the transversely extending flow barrier between the two adjacent distribution layer segments prevents or restricts resin flow therebetween from the higher positioned distribution layer segment to the lower distribution layer segment.

According to an embodiment of the invention, the supply of resin to the feed channel sections having the highest positioned point of the first feed channel may be continued after the resin supply to any other first feed channel sections has been stopped and preferably also after the supply of resin to any additional feed channels has been stopped, the supply of resin to the feed channel section having the highest positioned point being continued until the resin supply to the mould cavity is completed.

According to an embodiment of the invention, the resin inlet to the first feed channel may be arranged at 25-60% of the length of the blade shell half from the end of the root region, optionally at 25-55% thereof, and optionally at 30-50% thereof. Both when moulding the upwind shell half and the downwind shell half, it has proved to be advantageous to provide the inlet to the first feed channel in the above area of the blade shell half, i.e. the mould. However, an arrangement of the resin inlet to the first feed channel in the above area of the blade shell half have proved to be particularly advantageous when moulding the upwind blade shell half.

According to a further embodiment of the invention, the resin inlet to the first feed channel may be arranged at or adjacent the highest point thereof.

This embodiment is proved to be particularly advantageous when moulding the upwind blade shell half.

Further, it has proved to be advantageous to provide the resin inlet to any additional feed channels laterally spaced apart from the first feed channel at or adjacent the highest point thereof.

According to an embodiment of the invention, the first feed channel may be arranged in an area of the lowermost portion of the fibre lay-up as seen in the transverse direction of the mould.

Preferably, the mould part for moulding the upwind shell half may be arranged so that a line of the mould part corresponding to the centre line of the root region of the blade is arranged to tilt slightly upwardly relative to horizontal from the root region towards the tip region, thereby reducing the height difference between the lowermost portion of the mould surface in the root region and in the tip region.

In this connection the lowermost portion of the mould surface in the root region and the tip region may be arranged at approximately the same level.

Such an arrangement is particularly advantageous when moulding the upwind shell half, as the height difference between the lowermost portion of the mould surface and the highest portion of the mould surface thereby is minimised.

Furthermore, the mould part for moulding the downwind shell half may be arranged so that a line of the mould part corresponding to the centre line of the root region of the blade is arranged to tilt slightly downwardly relative to horizontal from the root region towards the tip region, thereby reducing the height difference between the lowermost portion of the mould surface in the root region and in the tip region.

Additionally, the mould part for moulding the upwind and downwind shell half, respectively, may be arranged to that the line corresponding to the centre line of the root region of the blade is titled upwardly and downwardly by the same degree. Thereby, a subsequent closing step, wherein the shell halves are joined while being retained in their respective mould parts, is facilitated.

The blade of the pre-bent wind turbine and thereby the blade shell half may have a length of more than 30 m, optionally of more than 40 m, optionally of more than 50 m and optionally of more than 60 m.

The blade and thereby the shell half may be pre-bent to such an extent that the tip of the blade and thereby the tip of the shell half is arranged more than 0.5 m, alternatively more than 1 m, alternatively more than 2 m, alternatively more than 3 m and alternatively more than 4 m from the centre line of the root.

Finally, the present invention relates to a blade shell half of a pre-bent wind turbine blade produced according to the method according to the invention, i.e. a method according the attached claim 1 and any of the claims dependent thereon.

The invention is explained in details below with reference to an embodiment shown in the drawings in which FIG. 1 is a schematic view of a wind turbine provided with three pre-bent blades, at least one of these blades having a blade shell half being produced according to the method according to the invention;

Figure 1:
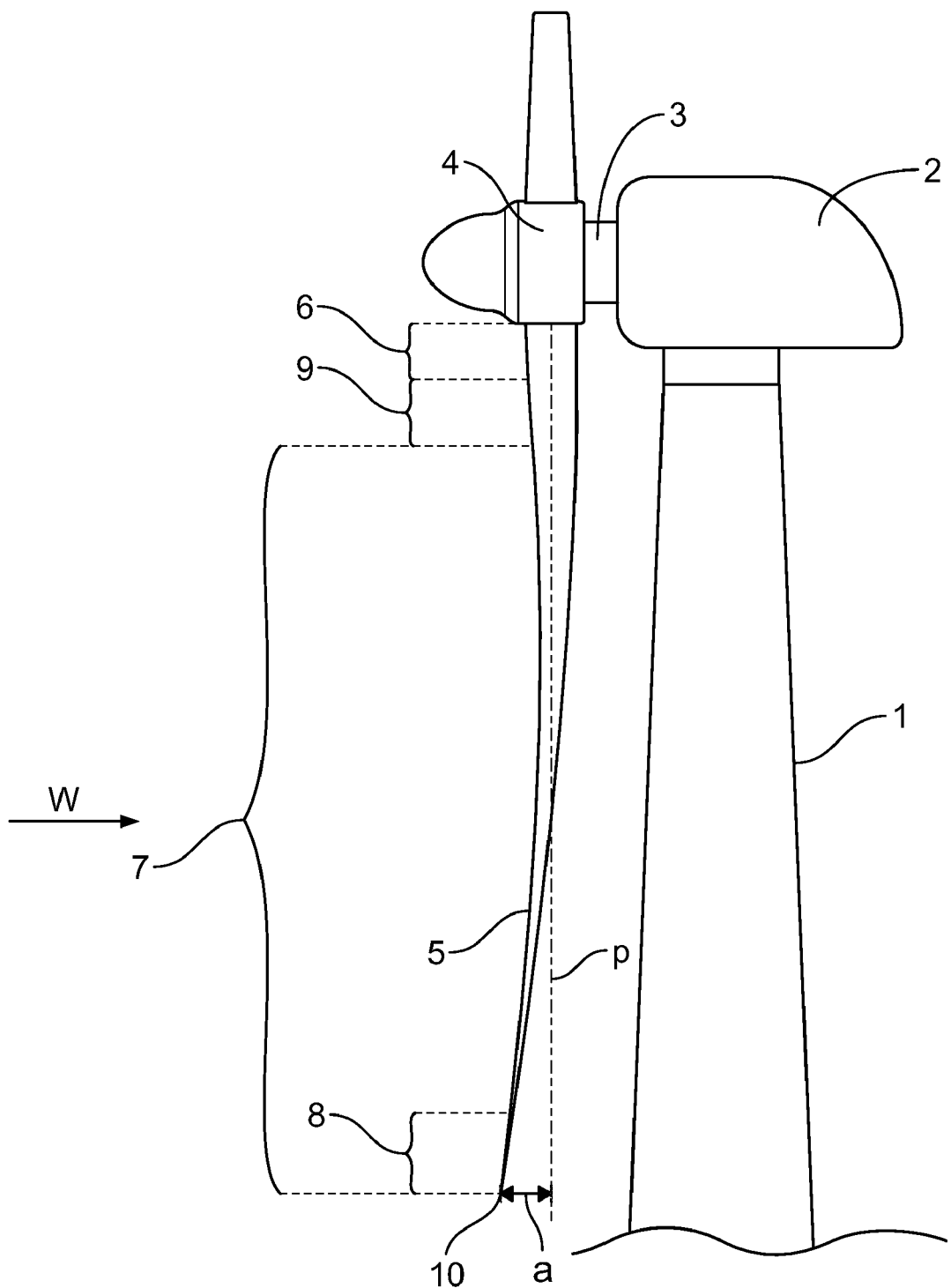
Figure 2:
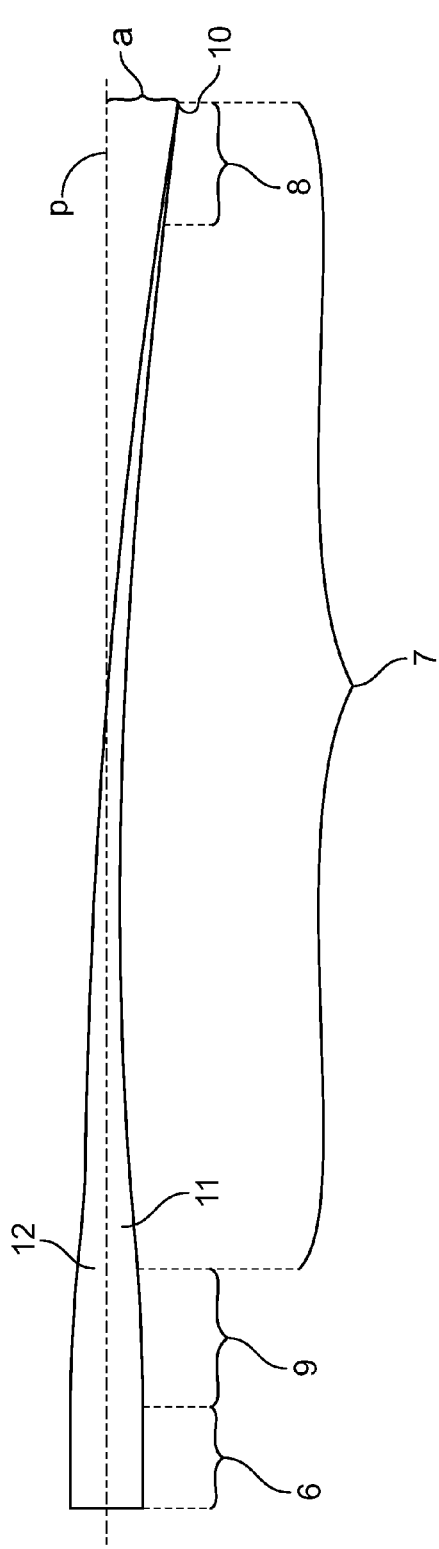
FIG. 2 is a side schematic view of one of the blades shown in FIG. 1.

The upwind wind turbine schematically shown in FIG. 1 comprises a tower 1, a nacelle 2 arranged rotatably on top of the tower 1, a main shaft 3 extending essentially horizontally from the nacelle 2 and being provided with a hub 4 from which three blades 5 extend radially. Each blade comprises a root region 6, an airfoil region 7 with a tip region 8, a transition region 9 between the root region 6 and the airfoil region 7, and a centre line P being defined by the centre line of the normally cylindrically shaped root region. This axis often corresponds to a pitch axis of the blade. The tip region 8 of the airfoil region 7 ends in a tip 10. The different regions of the blades are also shown in FIG. 2.

The blade 5 is a pre-bent blade extending forwardly against the wind in a forwardly curving manner so as to place the tip 10 at distance a in front of the centre line P as seen in the wind direction W. The blade 5 comprises two blade shell halves 11,12 connecting along a leading edge and a trailing edge of the blade. The blade shell half 11 forms the pressure side, also called the upwind side, of the blade, as it faces the wind during of operation of the wind turbine. The blade shell half 12 forms the suction side, also called the downwind side, of the blade, as it faces away from the wind during operation of the wind turbine.

Referring to FIGS. 3-7, an embodiment of the method according to the invention will be described with reference to the production of blade shell half 11 forming the upwind side of the blade 5.

Figure 3:
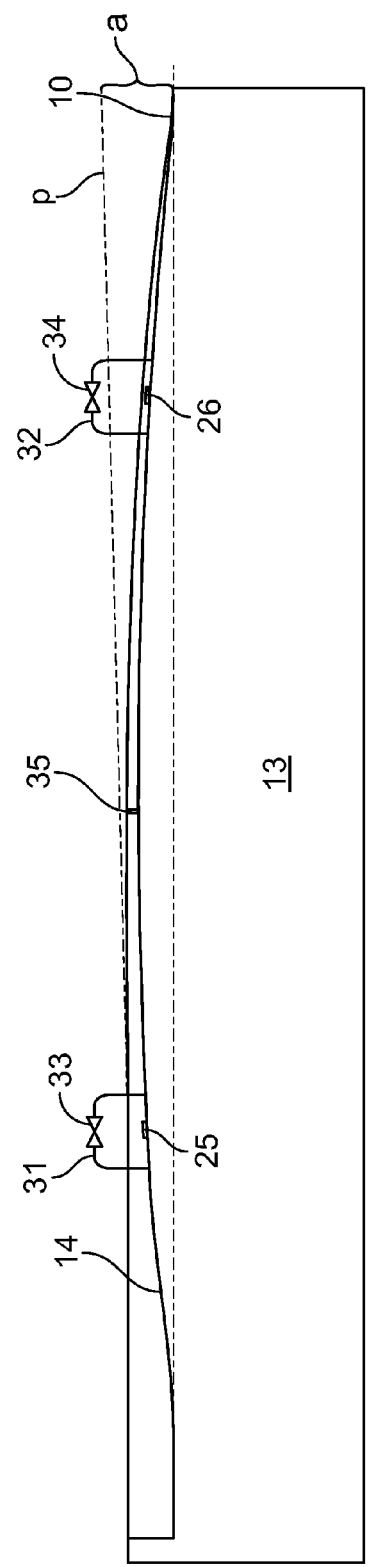
FIG. 3 is a schematic, longitudinal, sectional view of a rigid mould part for forming the pressure side, i.e. the upwind side of a blade shell half.

For manufacturing the blade shell half 11 a rigid mould part 13 is provided, said mould part 13 having a mould surface 14 forming the outer surface of the shell half, i.e. the pressure side of the blade. The mould part 13 is provided with an upper rim 15, as clearly seen in FIG. 7. As it most clearly appears from FIG. 3, the mould for moulding the upwind shell half 11 is arranged so that the line of the mould part corresponding to the centre line P of the root region of the blade is arranged to tilt slightly upwards relative to horizontal from the root region towards the tip region. In the present embodiment the lowermost portion of the mould surface in the root region and in the tip region is arranged at the same level, as shown in FIG. 3. As a result, the height difference between the highest and the lowest point of the lowermost portion of the mould surface when seen in the longitudinal direction is minimised.

A lay-up 16 comprising a number of fibre layers is placed on the mould surface 14. In the embodiment shown the fibre lay-up 16 comprises first fibre layers 17 arranged directly on the mould surface. On the first fibre layers a large number of fibre layers are placed in a longitudinally extending zone of the mould so as to provide a load-bearing structure 18 of the blade shell half.

As seen in the transverse direction of the mould the zone forming the load-bearing structure 18 is provided in the lowermost area of the mould surface. In the longitudinal direction the zone comprising a large number of fibre layers extends essentially from the root region to the tip region, as shown by dotted lines in FIG. 4. Additionally a plurality of fibre layers is arranged on the first lower fibre layers 17 at a region corresponding to the region of the leading edge and the trailing edge, respectively, of the blade shell half to provide a leading edge fibre reinforcement 19 and a trailing edge fibre reinforcement 20. A first core material 21 is arranged between the load-bearing structure 18 and the leading edge fibre reinforcement 19 and a second core material 22 is arranged between the load-bearing structure 18 and the trailing edge fibre reinforcement 20. The core material can be a hard polymer foam or balsawood. The fibre lay-up 16 is completed by arranging second fibre layers 23 on top of the load-bearing structure 18, the leading edge fibre reinforcement 19, the trailing edge fibre reinforcement 20, the first core material 21 and the second core material 22.

Next a distribution layer 24 is arranged on the second fibre layers 23. The distribution layer is divided into three distribution layer segments 24A, 24B, 24C by providing two flow barriers 25, 26 in the distribution layer 24 in areas thereof above the load-bearing structure 18. The flow barriers 25, 26 have a transverse extent so that they are provided only in the area of the distribution layer above the load-bearing structure 18 and not in the adjacent area of the lay-up 16. In the present embodiment the flow barriers 25, 26 are formed by a formable substance, such as a so-called tacky tape, and restrict longitudinal resin flow between the distribution layer segments.

Figure 7:
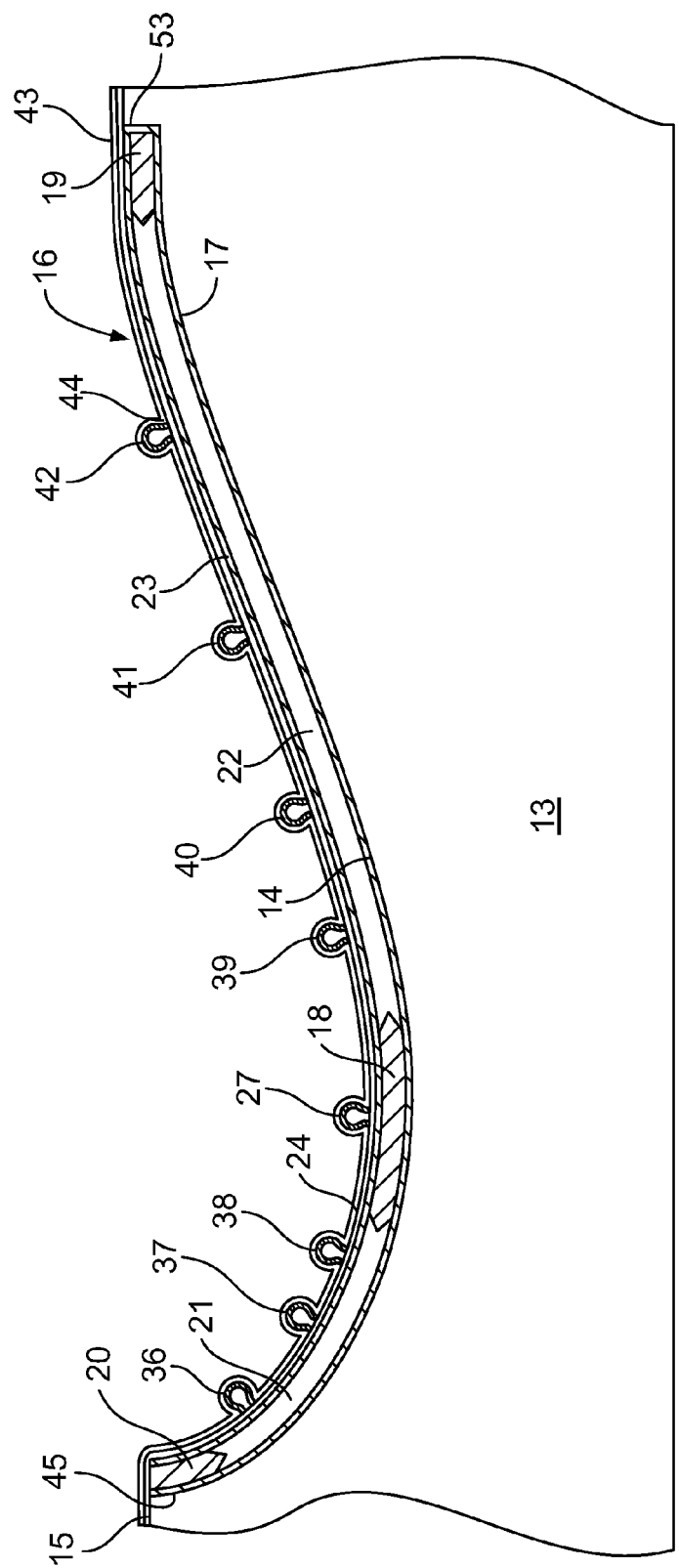
FIG. 7 is a schematic cross-sectional view along the lines VII in FIG. 4.

As especially shown in FIG. 3, the flow barriers 25 26 are arranged where the height difference between the lowest and the highest point of the mould surface 14 is within a predetermined range, such as below 1 m. A first longitudinally extending feed channel 27 is arranged on top of the distribution 24. The feed channel 27 is formed as a tube with an omega profile being opened towards the distribution layer 24, as shown in FIG. 7.

Figures 4, 5, 6:
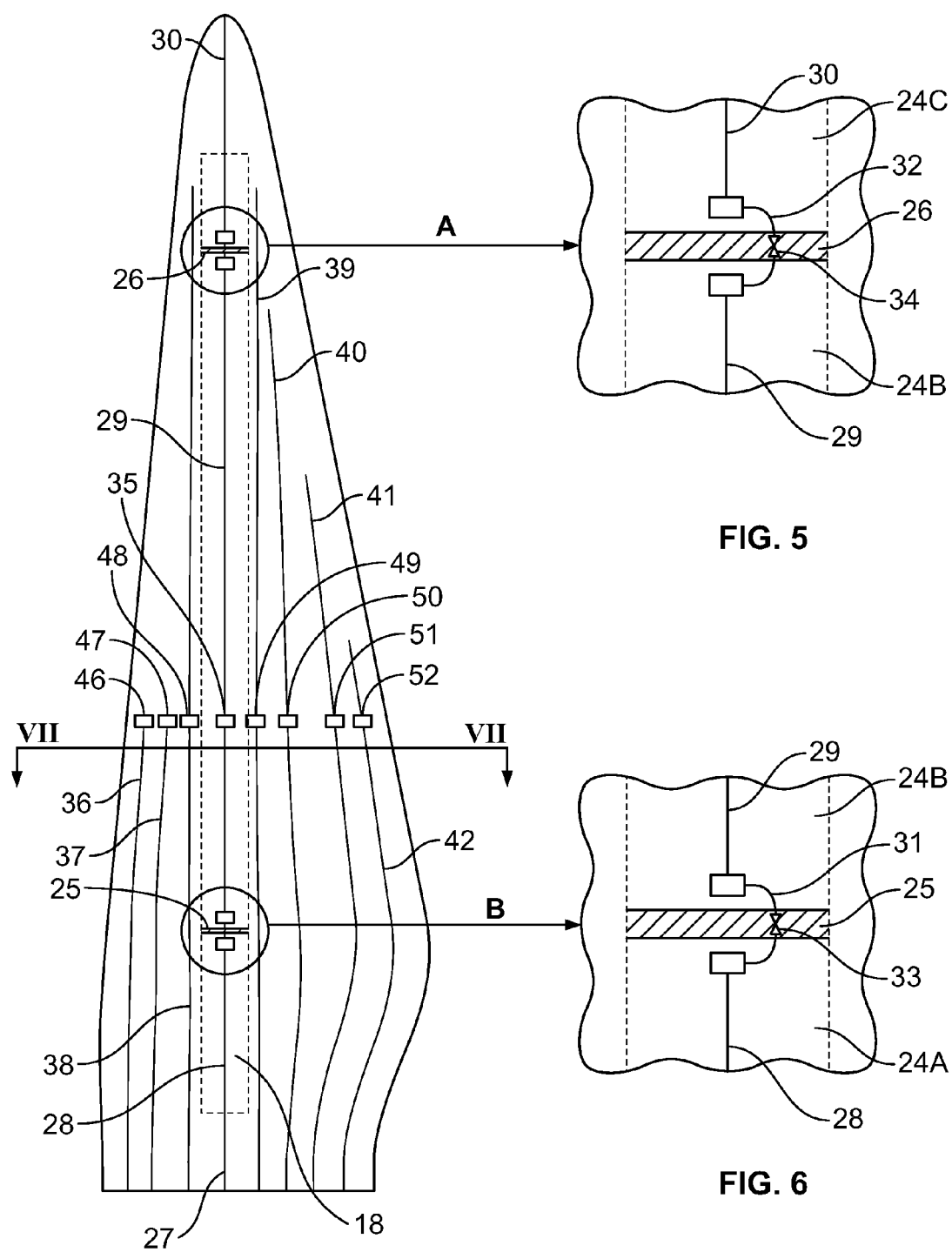
FIG. 4 is a schematic top view of the mould part shown in FIG. 3, the width of said mould part being enlarged for illustrative purposes.
FIG. 5 is a schematic top view of the encircled area A in FIG. 4.
FIG. 6 is a schematic top view of the encircled area B in FIG. 4.

The first feed channel 27 extends from the root region to the tip region, as shown in FIG. 4. It is divided into three feed channel sections 28, 29, 30 which are arranged in respective distribution layer segments. Longitudinally adjacent sections of the first feed channel 27 are interconnected by means of a connection line 31, 32 to provide resin communication between adjacent feed channel sections. A valve 33, 34 is arranged in each connection line 31, 32 to allow for an interruption of the resin flow between the adjacent feed channel sections. The connection lines 31, 32 provided with the valve 33, 34, respectively, most clearly appear from FIGS. 4-6.

Finally, it should be noted that a resin inlet 35 to the first feed channel is provided in the feed channel section and preferably at or in the highest area thereof which is also the highest area of the mould surface as seen in the longitudinal direction thereof.

Further, additional substantially longitudinally extending feed channels 36-42 are arranged above the fibre distribution layer 24 on either side of and laterally spaced apart from the longitudinally extending first feed channel 27. As seen in FIG. 4, the additional feed channels are continuous feed channels, i.e. they are not divided into sections, and the transversely extending flow barriers 25, 26 are not provided in the distribution layer below the additional feed channels. Further, the additional feed channels 36-42 are placed laterally outside the load-bearing structure 18. Resin inlets 46-52 to the additional feed channels are arranged in line with the resin inlet 35 to the first feed channel as seen in the transverse direction of the mould.

A vacuum bag 43 is arranged on top of the distribution layer 24 and the feed channels and sealed to the rim 15 of the mould part to form a mould cavity 44 between the vacuum bag 43 and the mould surface 14 of the mould part 13. The mould cavity is then evacuated and resin is supplied to the mould cavity.

Resin is supplied to the mould cavity through the inlet 35 to the mid section 29 of the first feed channel 27 and through the inlets 46-52 to the additional feed channels 36-42. First, resin is supplied to the first feed channel 27, the valves 33, 34 in the connection lines 31,32 being opened so that all three sections 28,29,30 of the first feed channel 27 are supplied with resin.

When the resin flow front towards the leading edge has passed the feed channel 38, resin is supplied to the feed channel 38 through the inlet 48. Correspondingly, resin is supplied to the feed channel 39 through the inlet 49 when the resin flow front towards the trailing edge has passed the feed channel 39.

Then, the valve 33, 34 is closed to stop the resin supply to the sections 28, 30 of the first feed channel 27. Resin supplied to the highest positioned section 29 of the first feed channel 27 is continued. Resin is then supplied in sequence to the feed channel 40, the feed channel 37, the feed channel 41, the feed channel 36, and the feed channel 42 through the respective inlets 50, 47, 51, 46, 52. During the sequential resin supply to the above feed channels, the resin supply to the feed channels 39, 38, 40, 37, 41, 36, 42 is stopped pre-determined points in time so as to obtain the desired resin impregnation of the lay-up. After the resin supply to all the additional feed channels has been stopped the resin supply to the inlet 35 to the first feed channel 27 continues until the desired fibre/resin ratio has been obtained in the fibre lay-up, especially in the zone of the fibre lay-up forming the load-bearing structure 18.

The provision of the flow barriers 25, 26 restricts or prevents resin flow through the distribution layer from the distribution layer segment 24B to the distribution layer segments 24A and 24C being positioned at a lower level than the distribution layer segment 24B during the continuous supply of resin to the channel section 27 being positioned above the distribution layer segment 24B. As a result, a resin surplus in the lay-up below the distribution layer segments 24A and 24B is prevented.

A resin surplus in said distribution layer segments 24A and 24B is further prevented by disconnecting the resin supply to the feed channel sections 27, 29 arranged above these the distribution layer segments 24A and 24B.

When the supply of resin is completed, the resin is allow to cure and the finished blade shell half forming the upwind side of the blade is connected to a finished blade shell half forming the downwind side of the blade, thereby forming a wind turbine blade.

Finally, it should be noted that the invention also relates to a wind turbine blade having at least one blade with at least one shell half being produced according to the method according to the invention, and a wind turbine being provided with such a blade.

The invention has been described with reference to an advantageous embodiment.

However, the scope of the invention is not limited to the described embodiment and alterations and modifications may be carried without deviating from the scope of the invention.

LIST OF REFERENCE NUMERALS 1 tower
2 nacelle
3 main shaft
4 hub
5 blades
6 root region
7 airfoil region
8 tip region
9 transition region
10 tip
11,12 blade shell halves
13 mould part
14 mould surface
15 upper rim
16 fibre lay-up
17 first fibre layers
18 load-bearing structure
19 leading edge fibre reinforcement
20 trailing edge fibre reinforcement
21 first core material
22 second core material
23 second fibre layers
24 distribution layer
24A distribution layer segment
24B distribution layer segment
24C distribution layer segment
25,26 flow barriers
27 first feed channel
28-30 feed channel section
31, 32 connection line
33, 34 valve
35 resin inlet
36-42 additional feed channel
43 vaccum bag
44 mould cavity
45 leading edge
46-52 resin inlet
53 trailing edge
a distance
P centre line
W wind direction

The invention claimed is:

1. A method of manufacturing a blade shell half of a pre-bent wind turbine blade comprising two blade shell halves interconnected along a leading edge and a trailing edge, said blade having a root region, an airfoil region with a tip region, optionally a transition region between the root region and the airfoil region, and a centre line defined by the centre line of the normally cylindrically shaped root region, the blade shell half made of a fibre composite material by means of vacuum-assisted resin transfer moulding (VARTM), wherein fibre material is impregnated with liquid resin in a mould cavity of a mould including a rigid mould part with a rim and a mould surface forming an outer surface of the blade shell half, said method comprising the following steps:
   a. placing a fibre lay-up including a number of fibre layers on the mould surface;
   b. placing a distribution layer above the fibre lay-up;
   c. providing at least one segmentation area in the distribution layer by dividing the distribution layer into at least two distribution layer segments as seen in a longitudinal direction of the rigid mould part by providing at least one transversely extending flow barrier in the distribution layer preventing or restricting longitudinal resin flow through the distribution layer;
   d. placing at least one first longitudinally extending feed channel above the distribution layer, said first feed channel open towards the distribution layer so as to provide resin communication therewith, and said first feed channel extending substantially from the root region to the tip region and divided into at least two separate feed channel sections, a feed channel section arranged in each distribution layer segment;
   e. arranging a vacuum bag on top of the rigid mould part and sealing the vacuum bag to the mould part to define the mould cavity;
   f. evacuating the mould cavity;
   g. supplying liquid resin to each feed channel section through a resin inlet so as to feed the resin to each of the at least two segments of the distribution layer in order to fill the mould cavity and to impregnate the fibre lay-up; and
   h. allowing resin to cure so as to form the blade shell half.

2. The method according to claim 1, wherein the first feed channel is divided into three feed channel sections and the distribution layer is divided into three distribution layer segments as seen in the longitudinal direction of the rigid mould part.

3. The method according to claim 1, wherein in step c the transversely extending flow barrier is provided by omitting the distribution layer in a transversely extending portion thereof.

4. The method according to claim 3, wherein the transversely extending portion in which the distribution layer is omitted has a width of 5-100 cm.

5. The method according to claim 1, wherein in step c the transversely extending flow barrier is provided by applying a formable substance to the distribution layer in a transversely extending portion thereof.

6. The method according to claim 1, wherein the first feed channel is divided into sections adjacent to or in the segmentation area in which the distribution layer is divided into distribution layer segments.

7. The method according to claim 6, wherein the first feed channel is divided into feed channel sections and the distribution layer is divided into distribution layer segments having a height difference between a lowest and a highest level of the mould surface of at most 1.6 m.

8. The method according to claim 6, wherein the first feed channel is divided into feed channel sections and the distribution layer is divided into distribution layer segments having a height difference between a lowest and a highest level of the mould surface selected from the group consisting of 1.4 m, 1.2 m, 1.0 m, and 0.8 m.

9. The method according to claim 1, wherein the first feed channel is divided into feed channel sections and the distribution layer is divided into distribution layer segments having a height difference between a lowest and a highest level of the mould surface selected from the group consisting of 1.4 m, 1.2 m, 1.0 m, and 0.8 m.

10. The method according to claim 1, wherein the first feed channel is divided into feed channel sections and the distribution layer is divided into distribution layer segments having a height difference between a lowest and a highest level of the mould surface of at most 1.6 m.

11. The method according to claim 1, wherein longitudinally adjacent sections of the first feed channel are interconnected by a connection line provided with a valve means between adjacent ends of the adjacent feed channel sections to allow for an interruption of the resin flow between said adjacent feed channel sections, the feed channel provided with a single inlet.

12. The method according to claim 1, wherein in step d at least one additional essentially longitudinally extending feed channel is arranged above the fibre distribution layer on either side of and laterally spaced apart from the longitudinally extending first feed channel,
    said additional feed channel or channels being continuous feed channel or channels that are not divided into sections, and
    the transversely extending flow barrier is not in the distribution layer below said additional feed channel or channels.

13. The method according to claim 1, wherein in step a a plurality of fibre layers is placed on top of each other in a longitudinally extending zone of the mould, said plurality of fibre layers forming a load-bearing structure of the blade shell half, said structure comprising a substantially higher number of fibre layers than laterally adjacent areas of the fibre lay-up, and
    wherein the at least one first feed channel is arranged in said zone forming the load-bearing structure.

14. The method according to claim 1, wherein the resin supply to adjacent sections of the first feed channel is controlled so that the resin supply to the section located at the lowest point of the mould surface is stopped prior to stopping the resin supply to the section located at the highest point of the mould surface.

15. The method according to claim 14, wherein the supply of resin to the feed channel sections located at the highest point of the first feed channel is continued after the resin supply to any other first feed channel sections has been stopped and after the supply of resin to any additional feed channels has been stopped, the supply of resin to the feed channel section located at the highest point continuing until the resin supply to the mould cavity is completed.

16. The method according to claim 1, wherein the resin inlet to the first feed channel is arranged at 25-60% of the length of the blade shell half from the end of the root region.

17. The method according to claim 1, wherein the resin inlet to the first feed channel is arranged at 25-55% of the length of the blade shell half from the end of the root region.

18. The method according to claim 1, wherein the resin inlet to the first feed channel is arranged at 30-50% of the length of the blade shell half from the end of the root region.

19. The method according to claim 1, wherein the resin inlet to the first feed channel is arranged at or adjacent the highest point of the mould surface.

20. The method according to claim 1, wherein the first feed channel is arranged in an area of the lowermost portion of the fibre lay-up as seen in the transverse direction of the mould.

* * * * *